(12) United States Patent
Huang et al.

(10) Patent No.: US 6,564,010 B1
(45) Date of Patent: May 13, 2003

(54) AQUARIUM THERMOSTAT

(75) Inventors: Bin-Juine Huang, Taipei (TW); Tse-Ju Huang, Panchiao (TW); Shueh-Cheng Lu, Tucheng (TW); Chin-Ting Lin, Shindian (TW)

(73) Assignee: U-Long Co., Ltd., Taipei (TW)

( * ) Notice: Subject to any disclaimer, the term of this patent is extended or adjusted under 35 U.S.C. 154(b) by 0 days.

(21) Appl. No.: 10/123,173

(22) Filed: Apr. 17, 2002

(51) Int. Cl.⁷ .................................................. F24H 1/10

(52) U.S. Cl. .......................................... 392/465; 62/3.7

(58) Field of Search ................................ 392/465, 485, 392/496; 62/3.7, 3.1, 3.2; 165/120, 122

(56) References Cited

U.S. PATENT DOCUMENTS

| | | | | |
|---|---|---|---|---|
| 4,867,102 A | * | 9/1989 | Turano | 119/259 |
| 5,299,424 A | * | 4/1994 | Woodson et al. | 62/3.7 |
| 5,822,993 A | * | 10/1998 | Attey | 62/3.7 |
| 6,044,901 A | * | 4/2000 | Basala | 165/122 |

* cited by examiner

Primary Examiner—Teresa Walberg
Assistant Examiner—Thor Campbell
(74) Attorney, Agent, or Firm—Bacon & Thomas, PLLC

(57) ABSTRACT

An aquarium thermostat comprises a ventilation box and a transforming mechanism disposed in the ventilation box such that the transforming mechanism is regulated by a microcomputer control mechanism to effect the generation of heating or cooling energy by which the aquarium water flowing into the aquarium thermostat is heated or cooled to a present level. The heated or cooled water is then sent back to the interior of the aquarium via a pipe.

5 Claims, 3 Drawing Sheets

AQUARIUM THERMOSTAT

FIELD OF THE INVENTION

The present invention relates generally to an aquarium thermostat, and more particularly to an aquarium thermostat for regulating temperature of aquarium water by recycling the aquarium water which is externally heated or cooled.

BACKGROUND OF THE INVENTION

It is vitally important to keep the water temperature of an aquarium constantly at an appropriate level at which the water animals or plants thrive. The water temperature of the aquarium can be caused to fluctuate by the seasonal factor as well as the way by which the aquarium is set up. For example, the water temperature tends to rise on the hot summer days while the water temperature tends to drop on the chilly winter days. In addition, an increase in the water temperature may be attributable to the heat which is generated by the filtration motor and the lighting fixtures of the aquarium. The addition of a heater or cooler to the aquarium is by no means effective in regulating the water temperature. The heater or cooler makes obnoxious noise.

SUMMARY OF THE INVENTION

The primary objective of the present invention is to provide an aquarium thermostat which is capable of regulating effectively the temperature of the aquarium water. The aquarium thermostat of the present invention is compact and suitable for use as an aquarium heater or cooler. In addition, the aquarium thermostat of the present invention can be easily installed and works quietly.

The aquarium thermostat of the present invention comprises a ventilation box and a transforming mechanism disposed in the ventilation box. The transforming mechanism is controlled by a microcomputer control mechanism to generate a heating energy or cooling energy. The transforming mechanism is in communication with the interior of the aquarium via a water inlet and a water outlet. The aquarium water is introduced into the transforming mechanism via the water inlet such that the aquarium water is heated or cooled. The heated or cooled aquarium water is then sent back into the aquarium via the water outlet.

The transforming mechanism comprises a flat duct element, two chips, two cooling elements, and two fluid drivers. The flat duct element connects the water inlet with the water outlet, so that the aquarium water flows therein can be heated or cooled by the two chips. The two chips are used to generate the heating energy and the cooling energy. The two chips have a first planar surface and a second planar surface, wherein the first planar surfaces are in contact with the flat duct element. When the first planar surface is in the state of heating, the second planar surface will be in the cooling state, or vice versa (Peltier effect). The two cooling elements are in contact with the second planar surfaces of the chips for cooling the chips. The fluid drivers are used to drive a cooling fluid from the outside of the ventilation box to flow through the cooling elements, so as to bring about the effect of cooling the chips.

Preferably, the transforming mechanism further comprises a pair of heat insulators, which are located between the flat duct element and the cooling elements.

The fluid driver of the present invention may be a fan. The cooling elements of the present invention are preferably provided with a plurality of parallel fins.

The transforming mechanism and the fluid drivers of the present invention are started by the micro computer control mechanism, which comprises a sensor for detecting the temperature of water in the water outlet, a control panel for setting temperature of the water of the aquarium, and a micro computer control circuit for switching the transforming mechanism between the states of generating the heating energy, the cooling energy, and off.

DETAILED DESCRIPTION OF THE PREFERRED EMBODIMENT

Figure 1:
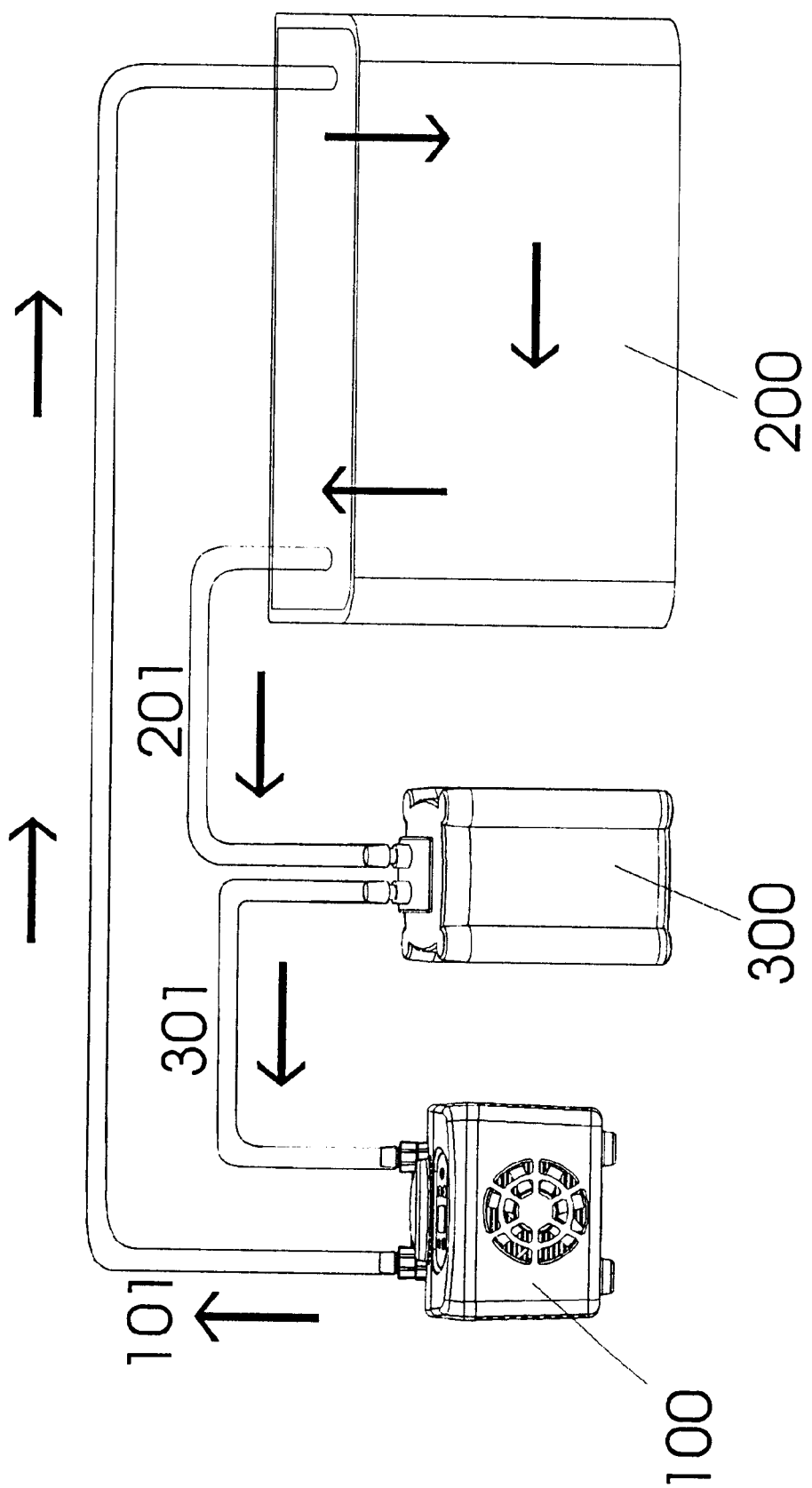
FIG. 1 shows a schematic view of the present invention at work.

As shown in all drawings provided herewith, an aquarium 200 is provided with a filter 300, which is located between the aquarium 200 and an aquarium thermostat 100 of the present invention. The filter 300 is intended to purify the aquarium water.

The filter 300 is connected to the aquarium 200 and the aquarium thermostat 100 of the present invention by pipes 201 and 301, respectively. The aquarium water enters the aquarium thermostat 100 of the present invention via the filter 300 such that the aquarium water is heated or cooled by the aquarium thermostat 100, and that the heated or cooled water is returned to the aquarium 200 via a pipe 101.

Figure 2:
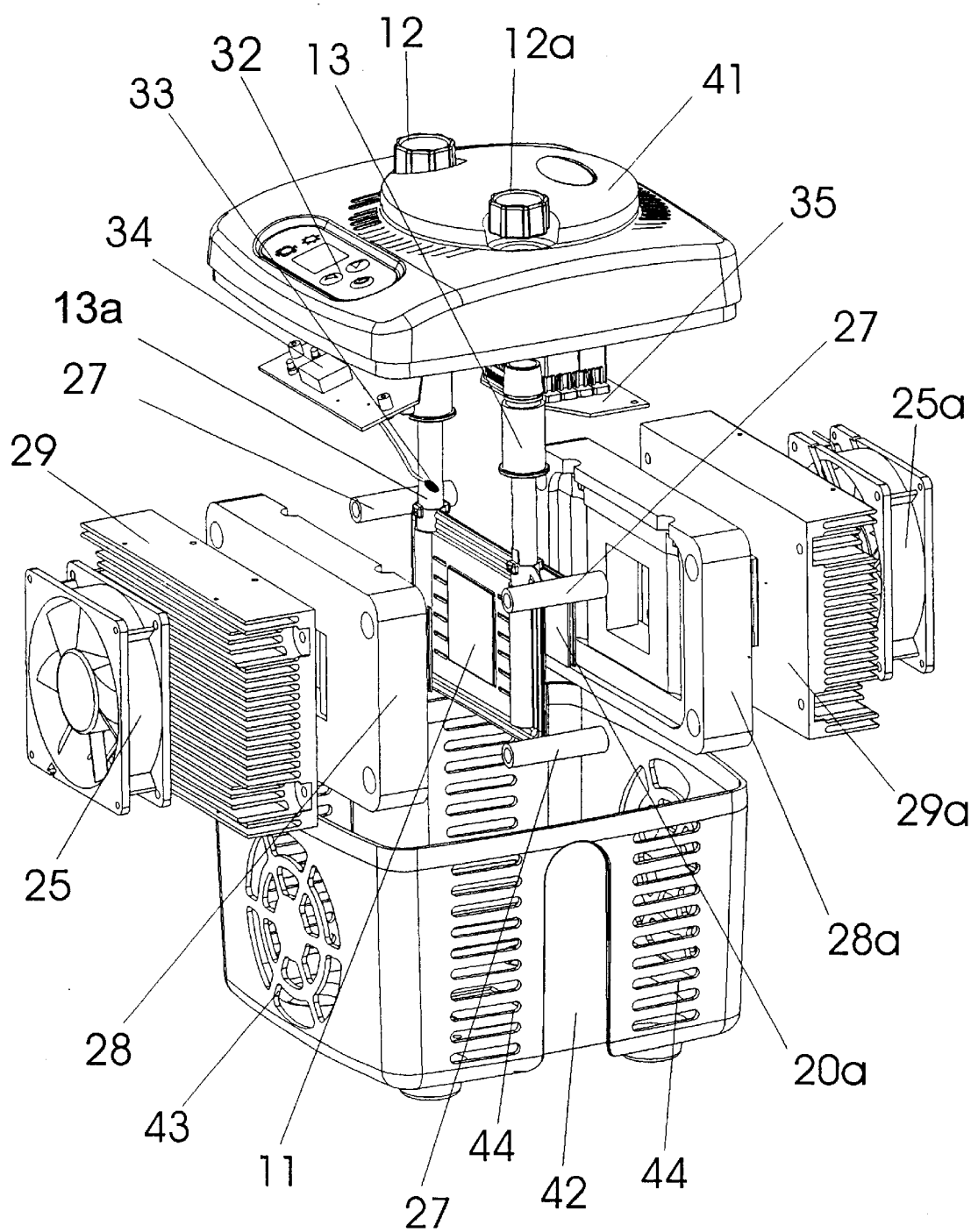
FIG. 2 shows an exploded view of the present invention.
Figure 3:
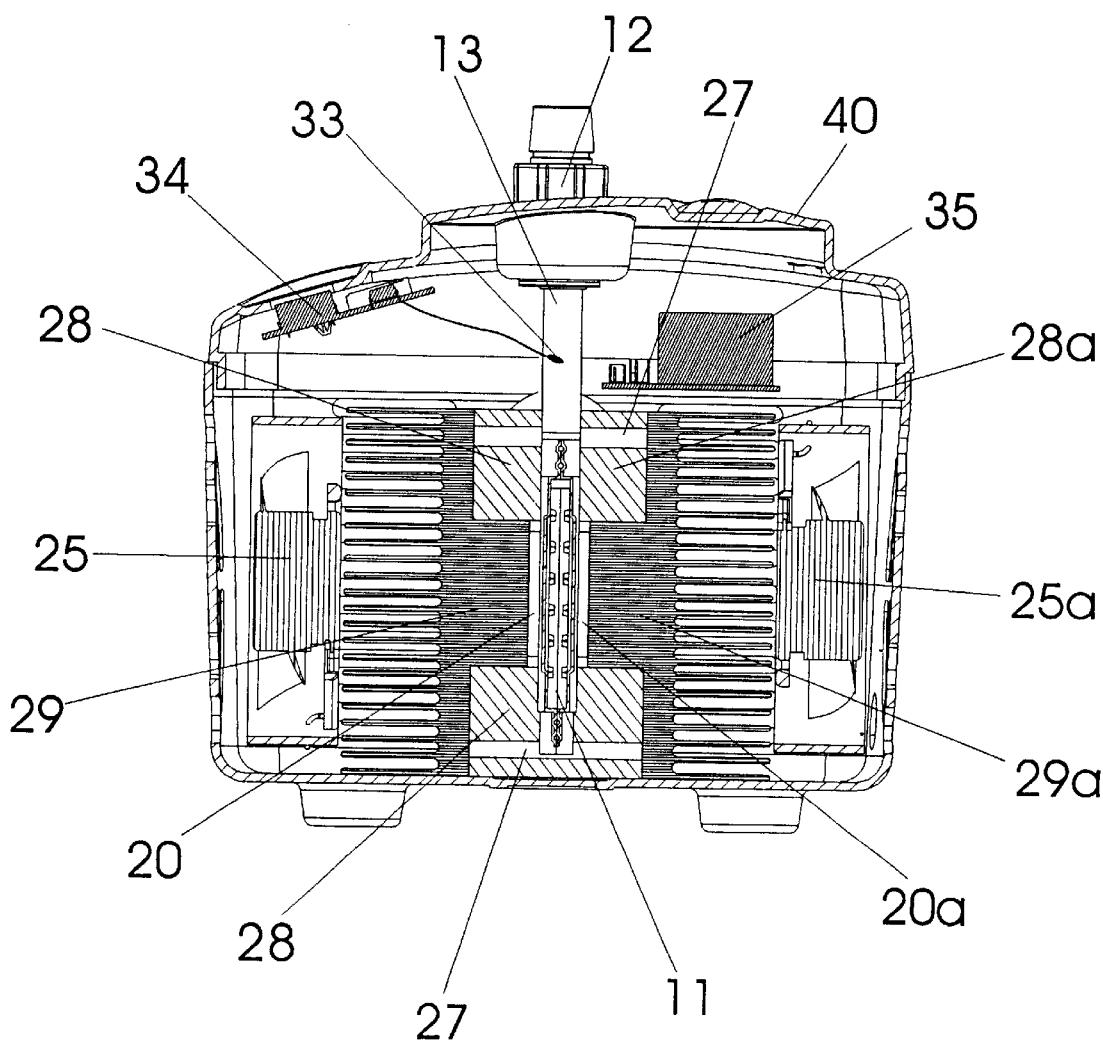
FIG. 3 shows a sectional view of the present invention in combination.

As shown in FIGS. 2 and 3, the aquarium thermostat 100 of the present invention includes a ventilation box 40 and a transforming mechanism, which is disposed in a lower housing 42 of the ventilation box 40 such that the transforming mechanism is covered by an upper housing 41 of the ventilation box 40, and that the transforming mechanism is controlled by a microcomputer control mechanism (32, 33, 34, 35) which is located in the upper housing 41.

The transforming mechanism comprises a flat duct element 11, two chips 20, 20a, two cooling elements 29, 29a, two insulating elements 28, 28a, and two fans 25, 25a.

The flat duct element 11 is in communication with the pipe 101 via a discharge pipe 13a. The pipe 101 and the discharge pipe 13a are fixed with a nut 12 of the upper housing 41. The flat duct element 11 is also in communication with the pipe 301 via an admission pipe 13. The pipes 301 and 13 are fixed by a nut 12a of the upper housing 41. The flat duct element 11 is connected at two sides with the chips 20, 20a, so as to enable the heating energy and the cooling energy of the chips to effect the heating or the cooling of the aquarium water which flows in the flat duct element 11.

The cooling elements 29, 29a are mounted such that they are opposite to the chips 20, 20a. The cooling elements 29 and 29a are provided on one side with a projection which is in contact with the chips 20, 20a, and on other side with a plurality of parallel fins to bring about the cooling effect.

The fans 25, 25a are mounted between the cooling elements 29 and 29a and air admission port 43 of the ventilation box 40 for sucking the atmospheric air in such that the air flows through the fins, and that the air is let out via the air discharge port 44 of the ventilation box 40.

As one side of the chips 20, 20a is in the heating state, other side of the chips will be in the cooling state, or vice versa (Peltier effect). The chips and the fans are started by the microcomputer control mechanism such that the chips are switched to bring about the heating energy or cooling energy. The microcomputer control mechanism comprises a control panel 32 to show the water temperature, a sensor 33 to detect the water temperature of the discharge pipe 13, a computer control circuit 34, and a power distribution circuit 35. As the water temperature is detected by the sensor 33 to be higher than a present temperature, the microcomputer control mechanism instruct the transforming mechanism to provide the cooling energy to the flat duct element 11. In other words, the signal is sent via the control circuit 34 to the chips 20, 20a, which effects the production of the cooling energy. In the meantime, the fans 25, 25a are started to expel the heating energy. The cooling energy is used by the flat duct element 11 to cool the water flowing therein. The cooled water is then sent back to the aquarium 200. In the event that the water temperature of the discharge pipe 13 is detected by the sensor 33 to be lower than a preset value, an instruction is sent via the control circuit 34 to the transforming mechanism to provide the heating energy. In other words, the instruction is received by the chips 20, 20a to effect the production of the heating energy. In the meantime, the fans 25, 25a are started to drive the cooling energy out. The heating energy is made available to the flat duct element 11 to heat the water flowing therein. The heated water is then sent back to the aquarium 200. If the water temperature of the discharge pipe 13 is detected by the sensor 33 to be in a predetermined range, the signal is sent via the control circuit 34 to the transforming mechanism, which is thus inactivated.

The insulating elements 28 and 28a are disposed between the cooling elements 29, 29a and the flat duct element 11 such that the projections of the cooling elements 29, 29a and the chips 20, 20a are covered by the insulating elements 28, 28a, thereby preventing the cooling (heating) source of the chips 20, 20a from being mixed with the heating (cooling) source of the cooling elements 29, 29a. In addition, four insulation pillars 27 are put through four corners of the insulating elements 28, 28a for fastening the insulating elements 28, 28a with the cooling elements 29, 29a by a plurality of threaded holes and screws. The insulation pillars 27 are made of phenolic resin.

The present invention described above is to be regarded in all respects as being merely illustrative. Accordingly, the present invention may be embodied in other specific forms without deviating from the spirit thereof. The present invention is therefore to be limited only by the scopes of the following claims.

What is claimed is:

1. An aquarium thermostat comprising a ventilation box and a transforming mechanism disposed in said ventilation box such that said transforming mechanism is regulated by a microcomputer control mechanism to effect a production of a heating energy or cooling energy, said transforming mechanism being in communication with the interior of the aquarium by a water admission pipe and a water discharge pipe such that aquarium water flowing through said water admission pipe can be heated or cooled by the heating energy or the cooling energy before flowing back into the interior of the aquarium via said water discharge pipe; and wherein said transforming mechanism includes:

a flat duct element connected with said water admission pipe and said water discharge pipe, so that the aquarium water flows through said flat duct element is heated or cooled by the heating energy or the cooling energy;

two chips for generating the heating energy or the cooling energy, said chips having a first planar surface in contact with said flat duct element, and a second planar surface opposite to said first planar surface, wherein when said first planar surface is in a heating state, said second planar surface will be in a cooling state, or vice versa;

two cooling elements in contact with said second planar surfaces of said two chips for cooling said chips; and two fluid drivers for driving fluid from an outside oft he ventilation box to flow past said cooling elements such that the fluid is let out of said ventilation box.

2. The aquarium thermostat as defined in claim 1, wherein said transforming mechanism further comprises two insulating elements which are disposed between said cooling elements and said flat duct element, so as to isolate a heat transfer between said cooling elements and said flat duct element.

3. The aquarium thermostat as defined in claim 1, wherein said fluid drivers are fans.

4. The aquarium thermostat as defined in claim 1, wherein said cooling elements have a plurality of fins parallel to one another.

5. The aquarium thermostat as defined in claim 1, wherein said transforming mechanism and said fluid drivers are activated by said microcomputer control mechanism, wherein said microcomputer control mechanism comprises a sensor for detecting temperature oft he water contained in said water discharge pipe, a control panel for setting temperature oft he aquarium water contained in the aquarium, and a microcomputer control circuit for switching said transforming mechanism between state of the production of the heating energy, the cooling energy and turning off the production.

* * * * *